Jan. 9, 1940.  B. O. AUSTIN  2,186,227
MOTOR CONTROL SYSTEM
Filed Aug. 12, 1938
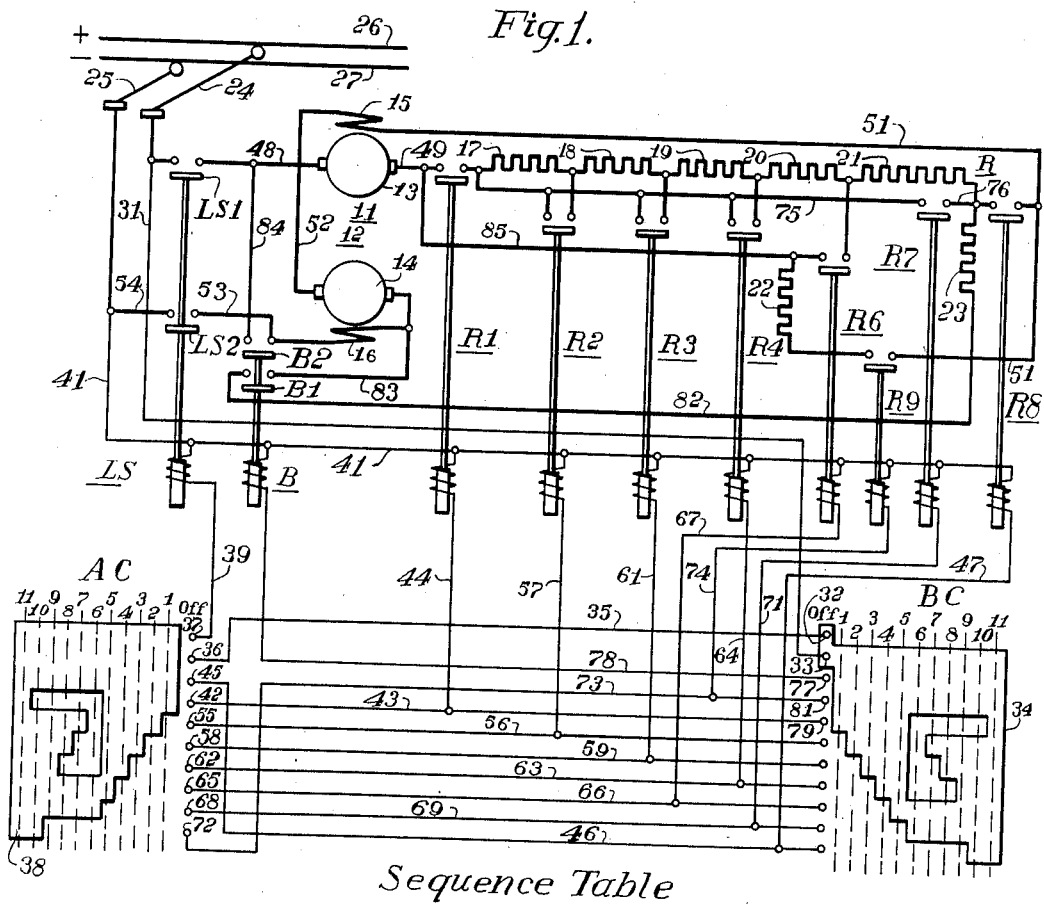
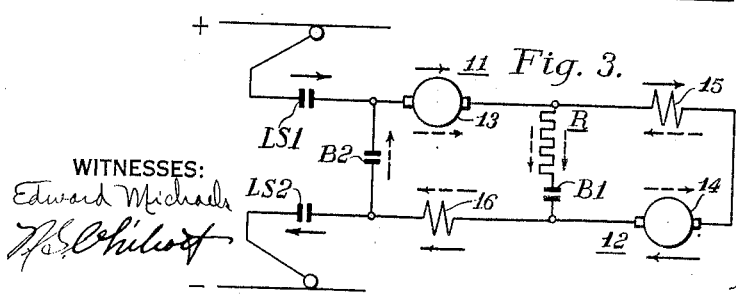
WITNESSES:
Edward Michaels
INVENTOR
Bascum O. Austin
BY
Crawford
ATTORNEY Patented Jan. 9, 1940

2,186,227

UNITED STATES PATENT OFFICE 2,186,227

MOTOR CONTROL SYSTEM

Bascum O. Austin, Forest Hills, Pa., assignor to Westinghouse Electric & Manufacturing Company, East Pittsburgh, Pa., a corporation of Pennsylvania Application August 12, 1938, Serial No. 224,558

7 Claims. (Cl. 172—179)

My invention relates, generally, to motor control systems and, more particularly, to systems for controlling both the acceleration and the deceleration of the propelling motors of electric vehicles, as, for example, trolley buses.

An object of my invention, generally stated, is to provide a control system for an electrically propelled vehicle which shall be simple and efficient in operation and which may be economically manufactured and installed.

A more specific object of my invention is to provide a motor control system in which a relatively large number of notches or steps are obtained during both acceleration and dynamic braking with a relatively small number of contactors or drum segments.

Another object of my invention is to utilize certain of the switches of a motor control system for dual purposes.

A further object of my invention is to provide a simple and effective dynamic braking circuit for electric motors.

Still another object of my invention is to operate a pair of electric motors in series-circuit relation during acceleration and in cross-connected relation during dynamic braking.

Other objects of my invention will be explained fully hereinafter or will be apparent to those skilled in the art.

In accordance with one embodiment of my invention, certain of the switches of a motor control system are utilized to establish the proper connections for acceleration and dynamic braking of the motors and also as resistor shunting switches, thereby performing dual functions and reducing the number of switches required. Furthermore, the motors are connected in series-circuit relation during acceleration and they are so connected during braking that the motor having the higher residual voltage causes current to circulate through both motors in a direction to cause the braking current to build up rapidly.

For a fuller understanding of the nature and objects of my invention, reference may be had to the following detailed description, taken in conjunction with the accompanying drawing, in which:

Figure 1 is a diagrammatic view of a control system embodying my invention,

Fig. 2 is a chart showing the sequence of operation of a portion of the apparatus illustrated in Fig. 1, and Fig. 3 is a schematic diagram showing the main circuit connections during motoring and braking operations.

Referring to the drawing, the system shown therein comprises a pair of electric motors 11 and 12 having armature windings 13 and 14, respectively, and series field windings 15 and 16, respectively; a line switch LS for connecting the motors to a power source; a braking switch B for establishing dynamic braking connections for the motors; a resistor R having a plurality of sections 17 to 23, inclusive, for controlling the motor current during both acceleration and deceleration; a plurality of switches R1, R2, R3, R4, R6, R7, R8 and R9 for shunting the resistor from the motor circuit; an accelerating controller AC and a braking controller BC for controlling the operation of the system during acceleration and deceleration, respectively.

The motors 11 and 12 may be of a type suitable for propelling an electric vehicle as, for example, a trolley bus (not shown). The power for operating the motors to accelerate the vehicle may be supplied from any suitable source through current collecting devices 24 and 25 which are disposed to engage overhead conductors 26 and 27, respectively.

In order to increase the smoothness of operation of the vehicle during both the accelerating and the decelerating periods of operation, the resistor shunting switches are so disposed that they may be operated first in one sequence to shunt a portion of the resistor R from the motor circuit step-by-step and then operated in a different sequence to recombine certain sections of the resistor in the motor circuit and then again shunt the resistors from the circuit, thereby increasing the number of control steps or notches provided with a certain number of the resistor shunting switches. In this manner, a large number of steps are obtained both during acceleration and dynamic braking without materially increasing the control equipment, which provides smoother operation of the vehicle and at the same time reduces the space required for the equipment in the vehicle.

With a view to further simplifying and reducing the equipment, certain of the switches, namely R8 and R9, are so disposed in the system that they perform the dual functions of combining the motors in the proper relation for acceleration and dynamic braking as well as shunting portions of the resistor R from the motor circuit, thereby increasing the number of control steps or notches available for controlling the operation of the motors.

In order to simplify the system still further, the motors 11 and 12 are connected in series-circuit relation during the acceleration of the vehicle and are so connected during dynamic braking that the braking current flows through the armature winding of one motor and the field winding of the other motor in the same direction as during acceleration and through the field winding of the first motor and the armature winding of the second motor in the reverse direction, thereby insuring that the braking current will build up rapidly to provide a quick response of the braking action.

In the system illustrated in the drawing, the proper sequence of operation of the control switches is controlled by the manually operated controllers AC and BC. However, it will be understood that automatic control of a type well known in the art may be provided if desired. As shown, the controllers AC and BC are so electrically interlocked that it is necessary for the braking controller BC to be in the "off" position before the accelerating control AC can function to operate the control equipment. However, the braking controller can function to operate the braking equipment irrespective of the position of the accelerating controller. In this manner, preference is given the braking controller in accordance with a well established practice to provide for emergency conditions of operation.

In order that the functioning of the foregoing apparatus may be more clearly understood, the operation of the system will now be described in more detail. Assuming that it is desired to accelerate the vehicle and that the controller BC is in the "off" position, the controller AC may be actuated through positions 1 to 11 in successive steps.

When the controller AC is actuated to position 1, the switches LS, R1 and R8 are closed, as indicated in the sequence chart shown in Fig. 2. The energizing circuit for the switch LS may be traced from the positive conductor 26 through the current collecting device 24, conductor 31, contact fingers 32 and 33 bridged by a segment 34 on the controller BC, conductor 35, contact fingers 36 and 37 bridged by a segment 38 on the controller AC, conductor 39, the actuating coil of the switch LS, conductor 41 and the current collecting device 25 to the negative conductor 27. The energizing circuit for the switch R1 extends from a contact finger 42 of the controller AC through conductors 43 and 44 and the actuating coil of the switch R1 to the negative conductor 41. The energizing circuit for the switch R8 extends from the contact finger 45 on the controller AC through conductors 46 and 47 and the actuating coil of the switch R8 to the negative conductor 41.

The closing of the switches LS, R1 and R8 connects the motors 11 and 12 to the power source in series-circuit relation and in series with certain portions of the resistor R. The motor circuit may be traced from the positive conductor 31 through the contact members LS1 of the switch LS, conductor 48, the armature winding 13 of the motor 11, conductor 49, the switch R1, the resistor sections 17 to 21, inclusive, the contact members of the switch R8, conductor 51, the field winding 15 of the motor 11, conductor 52, the armature winding 14 and the field winding 16 of the motor 12, conductor 53, the contact members LS2 of the switch LS and conductor 54 to the negative conductor 41.

By actuating the controller AC through positions 2, 3, 4 and 5 in successive steps, the switches R2, R3, R4 and R6 are closed to shunt the resistors 17 to 20 from the motor circuit step-by-step. The energizing circuit for the switch R2 may be traced from a contact finger 55 on the controller AC through conductors 56 and 57 and the actuating coil of the switch R2 to the negative conductor 41. The energizing circuit for the switch R3 extends from a contact finger 58 through conductors 59 and 61 and the actuating coil of the switch R3 to the negative conductor 41. Likewise the energizing circuit for the switch R4 extends from a contact finger 62 through conductors 63 and 64, the actuating coil of the switch R4 to the negative conductor 41. The energizing circuit for the switch R6 extends from a contact finger 65 through conductors 66 and 67 and the coil of the switch R6 to the negative conductor 41.

As indicated in the sequence chart shown in Fig. 2, the switches R1, R2, R3 and R4 are opened and the switch R7 is closed when the controller is actuated to position 6. In this manner certain portions of the resistor R are combined in parallel-circuit relation and reconnected in the motor circuit, thereby further reducing the total resistance in the motor circuit. The energizing circuit for the switch R7 may be traced from a contact finger 68 through conductors 69 and 71 and the actuating coil of the swicth R7 to the negative conductor 41.

When the controller is actuated to position 7, the switch R2 is reclosed to shunt the resistor 17 from the motor circuit. Likewise, the switch R3 is reclosed when the controller is actuated to the position 8 and the switch R4 is reclosed when the controller is moved to position 9.

When the controller is actuated to position 10, the switch R9 is closed to connect the resistor 22 in parallel circuit relation with the resistors 20 and 21, thereby providing an additional path for current to flow to the motors and further reducing the total resistance in the motor circuit. The energizing circuit for the switch R9 may be traced from a contact finger 72, conductors 73 and 74 and the actuating coil of the switch R9 to the negative conductor 41.

When the controller is actuated to position 11, the switch R1 is reclosed to shunt all of the resistors 17 to 22, inclusive, from the motor circuit, thereby connecting the motors 11 and 12 directly to the power source in series-circuit relation, which is the connection for operation of the vehicle at the maximum speed provided by the present system. The motor circuit may now be traced from the positive conductor 31 through the contact members LS1 of the switch LS, conductor 48, the armature winding 13, conductor 49, the contact members of the switch R1, conductor 75, the contact members of the switch R7, conductor 76, the contact members of the switch R8, conductor 51, the field winding 15 of the motor 11, conductor 52, armature winding 14 and field winding 16 of the motor 12, conductor 53, contact members LS2 of the switch LS and conductor 54 to the negative conductor 41.

If it is desired to decelerate the vehicle by rheostatic or dynamic braking, the controller BC is actuated to position 1, thereby deenergizing the conductor 35 and the controller AC, which deenergizes the switches closed during the accelerating period if the controller AC has not been previously moved to the "off" position. At this time the switches B, R1 and R9 are closed, as indicated in the sequence chart in Fig. 2, to establish dynamic braking connections for the motors and also connect the resistor R in the braking circuit, thereby limiting the amount of braking current permitted to flow through the motors. The energizing circuit for the switch B may be traced from a contact finger 77, which engages the segment 34 of the controller BC, through conductor 78 and the actuating coil of the switch B to the negative conductor 41. The energizing circuit for the switch R1 extends from a contact finger 79 through conductors 43 and 44 and the coil of the switch R1 to the negative conductor 41. The energizing circuit for the switch R9 extends from a contact finger 81 through conductors 73 and 74 and the coil of the switch R9 to the negative conductor 41.

The closing of the switches B, R1 and R9 so connects the motors that the field winding 15 of the motor 11 is in the circuit for the armature winding 14 of the motor 12 and likewise the field winding 16 of the motor 12 is in the circuit for the armature winding 13 of the motor 11. Furthermore, the entire resistor R is connected in the motor circuit to limit the circulating current, which flows through the armature winding of the motor 11 and the field winding of the motor 12 in the same direction as during acceleration and through the field winding of the motor 11 and the armature winding of the motor 12 in the reverse direction, thereby insuring stability of operation of the motors and a quick build up of the braking current.

The braking circuit for the motor 11 may be traced from one terminal of the armature winding 13 through conductor 49, the switch R1, the resistors 17, 18, 19, 20, 21 and 23, conductor 82, the contact members B1 of the switch B, conductor 83, a field winding 16 of the motor 12, the contact members B2 of the switch B and conductors 84 and 48 to the other terminal of the armature winding 13. Likewise the braking circuit for the motor 12 may be traced from one terminal of the armature winding 14 through conductor 52, the field winding 15 of the motor 11, conductor 51, the switch R9, the resistor 22, the conductor 85, the switch R1, the resistors 17, 18, 19, 20, 21 and 23, the conductor 82, the switch B1 and conductor 83 to the other terminal of the armature winding 14.

The operation of the motors during dynamic braking may be understood by referring to the schematic diagram shown in Fig. 3, in which the direction of the current through the motor windings during the motoring operation is indicated by solid arrows and the direction of flow of the current during the braking operation is indicated by dotted arrows. During the motoring or accelerating period, the switches LS1 and LS2 are closed, thereby connecting the motors in series-circuit relation, as hereinbefore explained, and permitting current to flow through the respective windings of the motors in the direction indicated by the solid arrows.

During dynamic braking the switches LS1 and LS2 are opened and the switches B1 and B2 are closed. The building up of the braking current depends upon the difference in the residual voltage of the two motors. As is well known, even though two machines may be of the same design they will have slightly different operating characteristics and, therefore, have different residual voltages. Assuming that the residual voltage of the motor 12 is higher than that of the motor 11, the counterelectromotive force of the machine 12 generated by the residual voltage causes current to circulate through the field winding 15 of the motor 11 in the reverse direction from the flow of current during the motoring operation, as indicated by the dotted arrows in Fig. 3. The reversal of current in the field winding 15 causes a reversal of the voltage of the motor 11. Therefore, the motor 11 circulates a current through the field winding 16 of the motor 12 in the same direction as during the motoring operation, as also indicated by the dotted arrows. Since the circulating current through the field winding 16 is in the same direction as during motoring, the residual voltage of the motor 12 is increased by the circulating current, thereby causing the voltage of this motor to build up further. This process continues until the current is limited by the resistor R, which, as previously described, is connected in the motor circuits during dynamic braking.

The resistor R may be shunted from the motor circuit by operating the switches R1 to R8 in a manner similar to that described in the explanation of the operation of the system during acceleration of the vehicle. The sequence of operation of the switches is shown in the chart illustrated in Fig. 2 and, since the energizing circuits for the switches have been previously traced, it is believed to be unnecessary to repeat this description at this time. The switches are energized successively by actuating the controller BC from position 1 to position 11, as indicated in the sequence chart.

It will be noted that the switch R8 is utilized to connect the motors 11 and 12 in series-circuit relation during the motoring operation and to shunt certain portions of the resistor R from the motor circuit during the braking operation. Likewise, the switch R9 is utilized to connect the motors in the proper relation for dynamic braking and it is also utilized to shunt portions of the resistor R from the motor circuit during the accelerating period. In this manner these switches perform dual functions, thereby decreasing the amount of control equipment required on the vehicle.

From the foregoing description it is apparent that I have provided a control system for controlling the operation of electric motors which requires a relatively small amount of equipment and at the same time provides sufficient accelerating and braking steps or notches to insure relatively smooth operation of the vehicle during both the accelerating and decelerating periods. Furthermore, a quick effect of the dynamic braking action is secured in a relatively simple manner without utilizing auxiliary power for exciting the machines during the braking operation.

I do not desire to be restricted to the particular form or arrangement of parts herein shown and described, since it is evident that they may be changed and modified without distinguishing from the spirit and scope of my invention as defined in the appended claims.

I claim as my invention:

1. In a motor control system, in combination, a plurality of electric motors, a power conductor, switching means for connecting the motors to the power conductor to cause current to flow through said motors in a predetermined direction to accelerate the motors, switching means for so connecting the motors during dynamic braking that the current flows through the armature winding of one of said motors in the same direction as during acceleration, and a resistor for controlling the motor current, a portion of said switching means being disposed to perform the dual functions of combining the motors and shunting portions of said resistor during acceleration and dynamic braking.

2. In a motor control system in combination, a plurality of electric motors, a power conductor, switching means for connecting the motors to the power conductor to cause current to flow through said motors in a predetermined direction to accelerate the motors, switching means for so connecting the motors during dynamic braking that the current flows through the armature winding of one of said motors and the field winding of another of said motors in the same direction as during acceleration, and a resistor for controlling the motor current, a portion of said switching means being disposed to perform the dual functions of combining the motors and shunting portions of said resistor during acceleration and dynamic braking.

3. In a motor control system, in combination, a pair of electric motors, a power conductor, switching means for connecting the motors to the power conductor in series-circuit relation to cause current to flow through said motors in a predetermined direction to accelerate the motors, switching means for establishing dynamic braking connections for the motors, said motors being so connected during dynamic braking that current flows through the armature winding of one motor in the same direction as during acceleration and through the armature winding of the other motor in the reverse direction, and a resistor for controlling the motor current, a portion of said switching means being disposed to perform the dual functions of combining the motors and shunting portions of said resistor during acceleration and dynamic braking.

4. In a motor control system, in combination, a pair of electric motors, a power conductor, switching means for connecting the motors to the power conductor in series-circuit relation to cause current to flow through said motors in a predetermined direction to accelerate the motors, switching means for establishing dynamic braking connections for the motors, said motors being so connected during dynamic braking that current flows through the armature winding of one motor and the field winding of the other motor in the same direction as during acceleration and through the field winding of the first motor and the armature winding of the second motor in the reverse direction, and a resistor for controlling the motor current, a portion of said switching means being disposed to combine the motors and also to shunt said resistor during acceleration and dynamic braking.

5. In a motor control system, in combination, a pair of electric motors, a power conductor, switching means for connecting the motors to the power conductor in series-circuit relation to cause current to flow through said motors in a predetermined direction to accelerate the motors, switching means for establishing dynamic braking connections for the motors, said motors being so cross-connected during dynamic braking that the field winding of each motor is in series-circuit relation with the armature winding of the other motor, the current flowing through the armature winding of one motor and the field winding of the other motor being in the same direction as during acceleration and the current flowing through the field winding of the first motor and the armature winding of the second motor being in the reverse direction, and a resistor for controlling the motor current during both acceleration and dynamic braking, a portion of said switching means being disposed to combine the motors and also to shunt said resistor.

6. In a motor control system, in combination, a plurality of electric motors for propelling a vehicle, a power conductor, switching means for connecting the motors to the power conductor to accelerate the vehicle, switching means for establishing dynamic braking connections for the motors to decelerate the vehicle, a resistor for controlling the motor current during acceleration and a deceleration of the vehicle, and a switch disposed to perform the dual functions of connecting the motors in series-circuit relation during acceleration and of shunting a portion of said resistor during dynamic braking.

7. In a motor control system, in combination, a plurality of electric motors for propelling a vehicle, a power conductor, switching means for connecting the motors to the power conductor to accelerate the vehicle, switching means for establishing dynamic braking connections for the motors to decelerate the vehicle, a resistor for controlling the motor current during acceleration and deceleration of the vehicle, and switches disposed to perform the dual function of combining the motors and shunting portions of said resistor during acceleration and dynamic braking.

BASCUM O. AUSTIN.